Feb. 15, 1927.

H. R. WHITTIER 1,617,975

TEMPERATURE INDICATOR

Filed March 23, 1922

INVENTOR
Horace R. Whittier
by
Harry P. Williams
ATTORNEY

Patented Feb. 15, 1927.

1,617,975

UNITED STATES PATENT OFFICE.

HORACE R. WHITTIER, OF PLYMOUTH, CONNECTICUT.

TEMPERATURE INDICATOR.

Application filed March 23, 1922. Serial No. 546,035.

This invention relates to means provided for indicating the temperature in ovens and chambers of stoves, ranges, sterilizers and the like heated by coal, gas, oil, electricity or steam.

The object of the invention is to provide a simple and cheap means comprising an indicator which can be neatly and tightly arranged in a transparent panel of an oven wall or door in such manner that the indicator fastening means are not observable from the exterior and a clear vision into the interior of the oven is possible entirely around the indicator.

This object is attained in the embodiment of the invention illustrated by providing of a glass panel that is adapted to be set into an oven wall or door, with an opening of a size to receive the body of the casing of a thermo-responsive and indicating mechanism. The cap which commonly fits over the front of the casing and holds the dial, the lining ring and the crystal in place, is provided with a flange that is slightly larger than the opening through the glass panel. After the casing has been located in the hole in the panel a ring which is also slightly larger than the hole, is attached to the back so that the glass around the hole will be clasped between the cap flange and ring sufficiently tight to prevent the escape of air and vapor from the oven around the casing.

Figure 1:
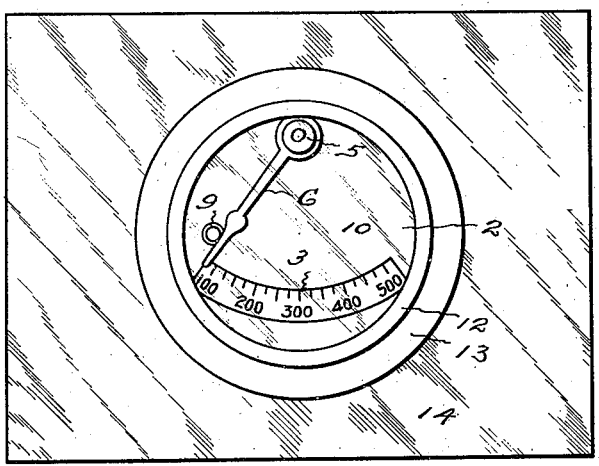
Figure 2:
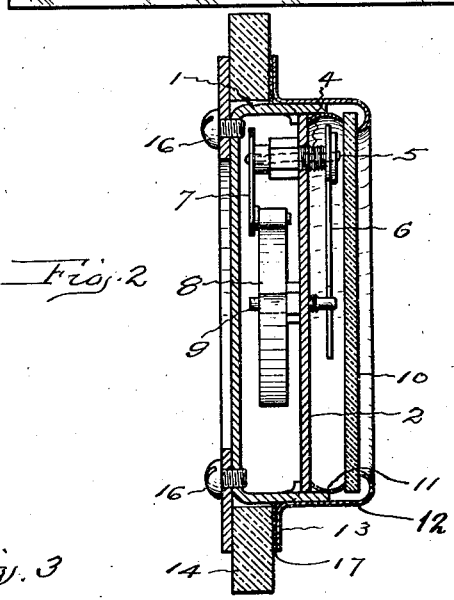
Figure 3:
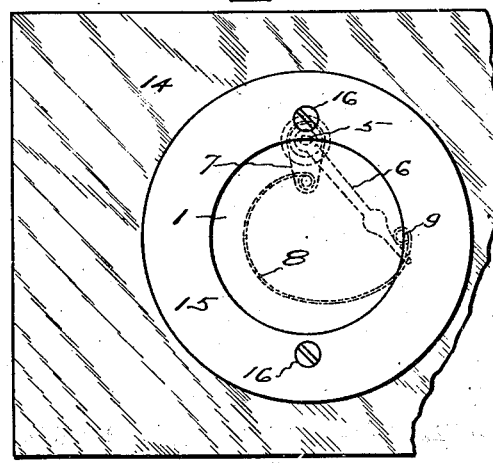

In the accompanying drawings Figure 1 shows a front view of a glass panel provided with a temperature indicating means constructed and assembled according to this invention. Fig. 2 shows on larger scale a diametrical section of the same. Fig. 3 shows a back view.

The thermo-responsive mechanism is enclosed in a cup-shaped casing 1, stamped to shape of sheet metal with a closed back and open front. In the casing is a dial plate 2 which is preferably formed of metal with an enamel front face provided with the desired scale 3. Screwed through the dial plate near one edge is a sleeve 4 and extending through this sleeve is a spindle 5. In front of the dial the spindle carries a pointer 6. Back of the dial the spindle has an arm 7. A curved thermo-responsive strip 8 made of the usually employed metals has one end connected with the arm on the spindle and the other end connected with a stud 9 that extends through the dial plate and on the front forms a stop for the pointer which is caused to swing over the scale as the strip expands and contracts under temperature changes. Over the front of the casing is a crystal or transparent disk 10. This crystal is separated from the dial plate by a lining ring 11 and these parts are held in place by a ring-shaped metallic cap 12 that has at its back edge an outwardly extending flange 13. The cap is desirably made so as to fit tightly over the open end of the casing.

A hole is molded or cut in the glass panel 14 of a size to receive the body of the casing. After the casing has been located in the hole in the glass a ring 15 or similar means which is slightly larger in diameter than the hole is fastened to the back of the casing, preferably by screws 16. By turning the screws in more or less the distance between the cap flange and the ring can be varied to fit glass panels of different thickness. It is desirable to place a gasket 17 between the cap flange and the edge of the glass and draw the ring up sufficiently tight to hold the indicator firmly without danger of breaking the glass.

With the structure described the thermo-responsive parts are held in the casing by the cap and the casing secured in the opening in the glass panel by means of the cap flange in front and the ring at the back. When the indicator is located in its place of use the fastening means are not observable from the front and the interior of the chamber or oven is visible entirely around the device, so that whatever is being treated in the chamber or oven by the heat which is indicated, is plainly visible. The particular type of thermo-responsive mechanism described herein is not essential to the invention. This mechanism may be varied in construction. The invention broadly stated resides in a construction whereby a heat indicator may be neatly and tightly set in a transparent panel that is adapted to be arranged in the wall or door of an oven or chamber, in such manner that the fastening means are not observable and a clear view around the indicator is possible.

The invention claimed is:

A temperature indicator designed to be set in an opening in a transparent panel, comprising a cup-shaped casing adapted to fit into an opening in the panel, said casing containing a dial, a thermo-responsive strip with one end attached to the dial and a pointer connected with the other end of the strip, with a transparent disk covering the open end of the casing, a cap fitted on the outer end of the casing and holding said disk, dial, strip and pointer in the casing, said cap having a laterally extending flange at its inner edge, and a ring attached to the back of the casing, said flange and ring being substantially the same diameter and designed to fit against opposite sides of the edges of the opening in the panel in which the casing is placed for clamping the indicator in place of use.

HORACE R. WHITTIER.